United States Patent
Ramasamy et al.

(10) Patent No.: US 8,364,090 B2
(45) Date of Patent: Jan. 29, 2013

(54) METHOD AND APPARATUS FOR WIRELESS RADIO FREQUENCY TEST SIGNAL GENERATION

(75) Inventors: Venkatasubramanian Ramasamy, San Jose, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 12/761,092

(22) Filed: Apr. 15, 2010

(65) Prior Publication Data
US 2011/0256863 A1   Oct. 20, 2011

(51) Int. Cl.
*H04B 17/00* (2006.01)
(52) U.S. Cl. .................. 455/67.14; 455/423; 455/115.2; 455/67.15
(58) Field of Classification Search .......... 455/423–425, 455/67.11–67.16, 67.7, 115.1–115.4, 226.1–226.4; 370/241–253
See application file for complete search history.

(56) References Cited

U.S. PATENT DOCUMENTS

| | | | |
|---|---|---|---|
| 6,208,841 B1 * | 3/2001 | Wallace et al. | 455/67.12 |
| 6,253,064 B1 * | 6/2001 | Monroe | 455/66.1 |
| 6,571,082 B1 | 5/2003 | Rahman et al. | |
| 7,075,893 B1 | 7/2006 | Mlinarsky et al. | |
| 7,522,884 B2 | 4/2009 | Turner et al. | |
| 8,090,395 B2 * | 1/2012 | Ngai et al. | 455/513 |
| 2004/0203727 A1 * | 10/2004 | Abiri et al. | 455/423 |
| 2006/0264178 A1 * | 11/2006 | Noble et al. | 455/67.11 |
| 2009/0047925 A1 | 2/2009 | Rahman | |
| 2009/0129281 A1 * | 5/2009 | Li | 370/252 |
| 2010/0003991 A1 | 1/2010 | Pao et al. | |
| 2012/0032854 A1 * | 2/2012 | Bull et al. | 342/450 |

FOREIGN PATENT DOCUMENTS

| | | |
|---|---|---|
| KR | 2006018081 | 2/2006 |
| WO | WO 01/13526 | 2/2001 |
| WO | WO 2008/056850 | 5/2008 |

OTHER PUBLICATIONS

White et al, "Lowering the Barrier to Wireless and Mobile Experimentation," http://www.csl.cornell.edu/~bwhite/papers/barrier-hotnets1.pdf, 2002.
Varga et al., "An Overview of the OMNeT ++ Simulation Environment," http://www.omnetpp.org/doc/workshop2008/omnetpp40-paper.pdf, 2008.

* cited by examiner

*Primary Examiner* — Kamran Afshar
*Assistant Examiner* — Marisol Fahnert
(74) *Attorney, Agent, or Firm* — Womble Carlyle Sandridge & Rice LLP

(57) ABSTRACT

Generating a radio frequency test signal for a mobile wireless communication device from a set of scanned radio frequency data that represents a plurality of radio frequency channels over a sequence of time intervals. A segment of the set of scanned radio frequency data over a time interval is classified into one of several radio frequency environments. A subset of the segment of scanned radio frequency data is selected based on the classified radio frequency environment. A segment of the radio frequency test signal is generated using the selected subset of scanned radio frequency data. The steps of classifying, selecting and generating are repeated for each time interval in the sequence of time intervals. Classifying the segment of scanned radio frequency data into a radio frequency environment includes comparing a set of statistics extracted from the segment of scanned radio frequency data to pre-defined classification ranges.

23 Claims, 5 Drawing Sheets

METHOD AND APPARATUS FOR WIRELESS RADIO FREQUENCY TEST SIGNAL GENERATION

TECHNICAL FIELD

The described embodiments relate generally to wireless mobile communications. More particularly, a method is described for classifying and testing wireless radio frequency signals received by a mobile wireless communication device from base transceiver stations in a wireless communication network.

BACKGROUND OF THE INVENTION

Mobile wireless communication devices, such as a wireless cellular telephone or a wireless enabled computer tablet, can provide a wide variety of communication services including, for example, voice communication, text messaging, internet browsing, and audio/video streaming. Wireless communication networks can use different standardized communication protocols, such as the Global System for Mobile Communications (GSM) and the Universal Mobile Telecommunication System (UMTS). Each of these standardized communication protocols can specify access techniques that permit the simultaneous service of multiple mobile wireless communication devices by a wireless communication network. Communication protocols can also define conformance tests under which mobile wireless communication devices can be tested for performance and compliance. Conformance testing, however, can provide limited information for testing and debugging a particular product design. Users of mobile wireless communication devices expect good performance for both voice and data services under a variety of operating scenarios that can vary widely, for example from dense urban areas to rural expanses to indoor locations. Each operating scenario can present a different combination of effects on radio frequency signals transmitted between the mobile wireless communication device and base transceiver stations (BTS) located in cells of a wireless communication network.

Estimating the performance of the mobile wireless communication device when used in different operating scenarios can require extensive testing, both in actual field test environments and in simulated laboratory settings. Re-using test data gathered by radio frequency scanners during an actual field test can provide a flexible test platform in a laboratory setting, in particular when the field test data can be modified to represent a variety of operating scenarios. Radio frequency scanners can acquire a multitude of statistics based on signals received from a base transceiver station located in a cell of a wireless communication network. Multiple base transceiver stations can be observed simultaneously and statistical data gathered from each during a mobile wireless communication device field test. Limits on a feasible set of laboratory test equipment through which to process the scanned data can require selecting a subset of the scanned data for further analysis and simulation. Typically a subset of the acquired statistical data can provide an accurate characterization of the field test environment to evaluate performance of a mobile wireless communication device. An appropriate subset of gathered statistical data can depend on the operating scenario under which the data was obtained, and laboratory equipment can play back the scanned data based on a selected operating scenario. The actual operating scenario, however, can vary throughout the actual field test, as the mobile wireless communication device can move between different radio frequency environments. An accurate reproduction of the field test, as well as adaptations of the field test to new operating scenarios, can benefit from dynamically estimating the radio frequency environment using statistics in the scanned data. The play back and mapping of scanned data can be dynamically adapted based on the estimated radio frequency environment, rather than using a single fixed operating scenario.

SUMMARY OF THE DESCRIBED EMBODIMENTS

This paper describes various embodiments that relate to methods to classifying and testing wireless radio frequency signals received by a mobile wireless communication device from base transceiver stations in a wireless communication network. A method to classify changing radio frequency propagation environments and dynamically to adapt play back and mapping of scanned data for testing mobile wireless communication devices is described.

In one embodiment a method of generating a radio frequency test signal for a mobile wireless communication device from a set of scanned radio frequency data is described. The set of scanned radio frequency data represents a plurality of radio frequency channels over a sequence of time intervals. The method includes at least the following steps. First, a segment of the set of scanned radio frequency data over a time interval is classified into one of several radio frequency environments. Next, a subset of the segment of scanned radio frequency data is selected based on the classified radio frequency environment. Finally, a segment of the radio frequency test signal is generated from the selected subset of scanned radio frequency data. The steps of classifying, selecting and generating are repeated for each time interval in the sequence of time intervals. In some embodiments, classifying the segment of scanned radio frequency data into a radio frequency environment includes comparing a set of statistics extracted from the segment of scanned radio frequency data to pre-defined classification ranges. In further embodiments of the method, generating the segment of radio frequency test signal includes shifting a portion of the selected subset of scanned radio frequency data to a different frequency carrier or into a different time interval.

In another embodiment, an apparatus for generating a radio frequency test signal for testing a mobile wireless communication device is described. The apparatus includes a radio frequency test generator configured to divide a set of scanned radio frequency data into a sequence of segments and to classify each segment into a radio frequency environment. Each segment of scanned radio frequency data represents a plurality of radio frequency channels collected over a distinct time interval. The apparatus is further configured to select a subset of each segment of scanned radio frequency data based on the classified radio frequency environment for the segment and to generate a segment of the radio frequency test signal based on each selected subset of scanned radio frequency data. In some embodiments, the radio frequency test generator further generates a segment of radio frequency noise data. Receive noise power data for a subset of radio frequency channels associated with the selected subset of scanned radio frequency data is calculated over the time interval. The calculated noise power data is removed from total receive power data of the scanned radio frequency data over the time interval to generate the segment of radio frequency noise data. In a further embodiment, the radio frequency test generator generates a segment of radio frequency channel data based on Doppler shift and multi-path data for the plurality of radio frequency channels in the segment of scanned radio frequency data over the time interval.

In yet another embodiment, a non-transitory computer readable medium for tangibly storing computer program code executable by a processor for generating a radio frequency test signal for a mobile wireless communication device from a set of scanned radio frequency data is disclosed. The non-transitory computer readable medium includes computer program code for classifying a segment of scanned radio frequency data collected from a plurality of base transceiver stations over a time interval into one of a plurality of radio frequency environments. The non-transitory computer readable medium further includes computer program code for filtering the segment of scanned radio frequency data, for selecting a subset of the filtered segment of scanned radio frequency data based on the classified radio frequency environment and for generating a segment of the radio frequency test signal from the selected subset of scanned radio frequency data.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
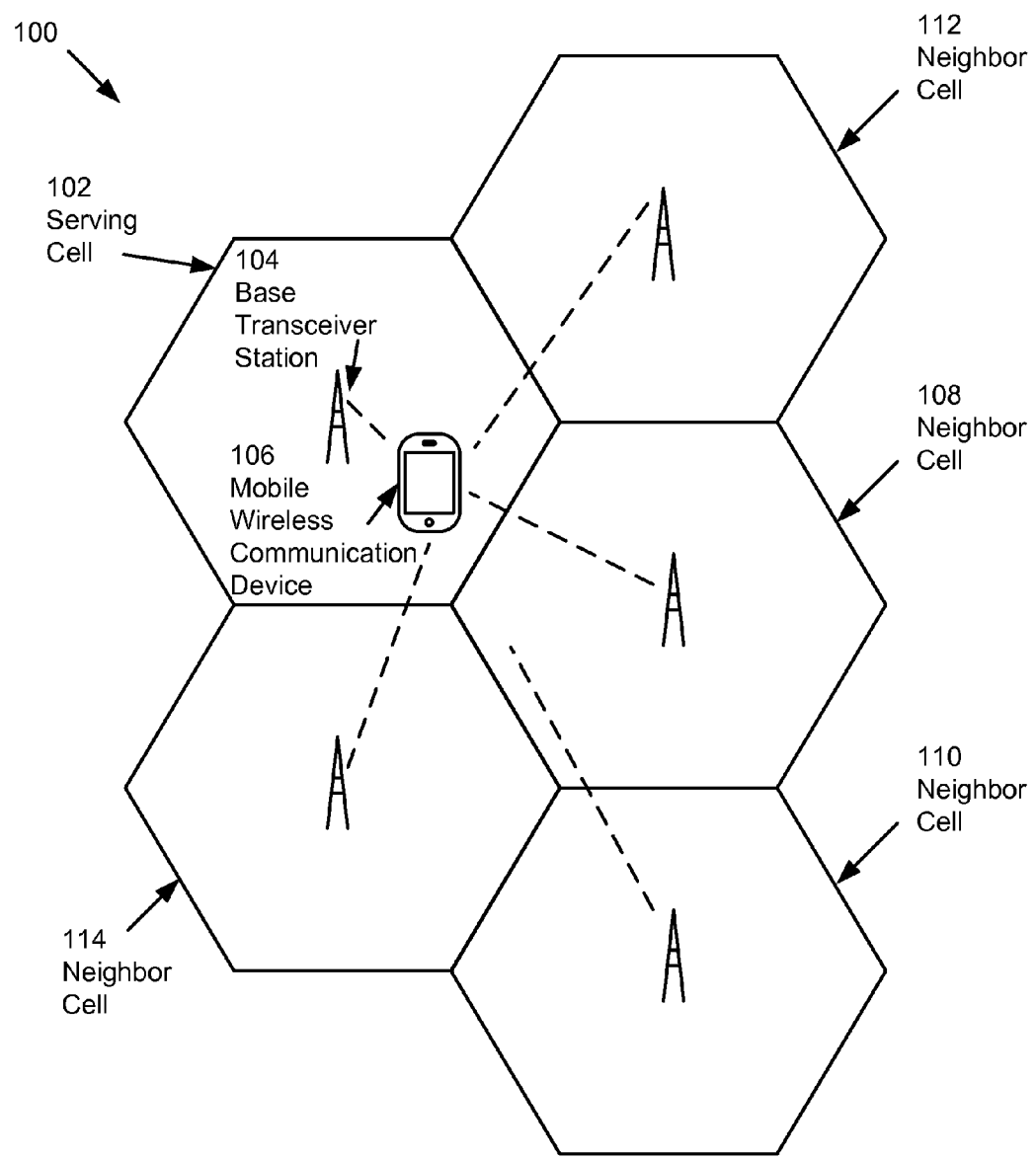
FIG. 1 illustrates a mobile wireless communication device connected to base transceiver stations in a wireless communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Statistical data collected by radio frequency scanners during field tests can simultaneously measure signals transmitted and received between a mobile wireless communication device and multiple base transceiver stations located in different cells of a wireless communication network. Example statistics gathered by the radio frequency scanner can include radio frequency properties of signals such as signal levels, ambient environment data such as noise levels and varying network properties such as a number of distinct cells detected. The scanned statistical data can be replayed in a laboratory environment using test equipment to evaluate the performance of mobile wireless communication devices, including testing changes to hardware and firmware used therein. As radio frequency scanners can collect data from base transceiver stations located in many different cells simultaneously, for example more than fifteen distinct cells can typically be observed in an urban test, selecting a reduced set of data from particular cells during play back can be helpful. The cells that can be most important to characterizing the performance of the connection between the mobile wireless communication device and the wireless communication network can vary throughout the duration of the set of scanned statistical data.

Approximately five cells of a wireless communication network can determine the performance of a voice and data connection to a mobile wireless communication device at a particular location and time. Which five cells, of the more than fifteen cells measured by the scanner, that can influence the performance of the mobile wireless communication device can vary throughout a field test. In particular, as the mobile wireless communication device changes location, direction, speed and time of day within a wireless communication network, the radio frequency environment can vary significantly. Test equipment can be programmed to play back the scanned statistical data assuming a particular radio frequency environment, and each radio frequency environment can result in a different set of five cells selected for play back. Thus, assigning a radio frequency environment to a play back of scanned statistical data in a laboratory test can produce different results based on the same set of scanned statistical data. To re-create a variety of radio frequency environments encountered during a field test, dynamically determining a sequence of radio frequency environments based on examining the set of scanned statistical data can result in a more accurate laboratory test than using a fixed radio frequency environment setting for the entire set of scanned data.

FIG. 1 illustrates a wireless communication network 100 including multiple cells to which a mobile wireless communication device 106 can connect. The mobile wireless communication device 106 can be associated with a serving cell 102 and can receive signals from a base transceiver station 104 in the serving cell as well as from base transceiver stations located in neighbor cells 108/112/114. A base transceiver station in a neighbor cell 110 can be at a sufficiently long distance (or be occluded by intervening structures) so that signals from the neighbor cell 110 can not be detected by the mobile wireless communication device 106. A radio frequency scanner, such as used during an actual field test (also known as a "drive test") to characterize a radio frequency propagation environment of the wireless communication network, can also receive signals from base transceiver stations in the serving cell 104 and a number of neighbor cells. The sensitivity of the radio frequency scanner can be higher than that of the mobile wireless communication device 106, so that when positioned at the same location as the mobile wireless communication device, signals from base transceiver stations in fifteen or more cells of the wireless communication network 100 can be detected, and statistical data for each base transceiver station measured and recorded.

The radio frequency scanner can be used to capture a broad range of statistical data, such as signal strength across different radio frequency bands, and also to demodulate and decode received signals for network information such as base transceiver station identity codes, also known as scrambling codes. The captured statistical data can be grouped by the radio frequency scanner based on the decoded scrambling codes. For each scrambling code a set of statistics can be presented. For example signal strength, delay spread and a number of paths observed by the radio frequency scanner at that particular location and time for each scrambling code can be measured and displayed. To play back and analyze the captured statistical data in a laboratory, the statistical data can be ranked and sorted based on one or more particular signal properties, with signals from the "highest" ranked scrambling codes used for testing the performance of the mobile wireless communication device 106. Choosing a subset of captured statistical data can be referred to as "mapping." A mapping can select different subsets of the captured statistical data during a time interval depending on a radio frequency environment estimated or applied to that time interval. Representative radio frequency environments can include urban, suburban, rural, highway and indoor environments, each environment representing a different operating scenario in which the statistical data can be captured.

Each radio frequency environment can be characterized by a set of factors that affect the radio frequency signals transmitted and received between the base transceiver station and the mobile wireless communication device differently. For example, an "urban" environment can include a large number of tall buildings (resulting in significant amounts of multipath) with many users densely located in a large number of overlapping cells of varying sizes. A "suburban" environment can include a medium number of smaller buildings with many users geographically dispersed across a wider area than the "urban" environment. A "rural" environment can include a small number of small buildings with fewer users spread over a wide geographic area and a limited number of cells. A "highway" environment can include a moderate number of users with high speed mobility across the area and frequent shifts in the set of observable cells. An "indoor" environment can be defined by a multitude of radio frequency obstructions and in some cases micro-cells with limited range that "repeater" signals from larger macro-cells.

During play back of a set of statistical data collected by a radio frequency scanner, mapping of the statistical data into a subset of statistical data can differ when processing statistical data collected in different radio frequency environments. The play back does not necessarily need to know a priori the radio frequency environment in which the statistical data was collected. Instead, play back can select a mapping based on a radio frequency environment chosen automatically by analyzing characteristics of the statistical data over a particular time interval. It should be noted that while some radio frequency scanners can log geographic location information (e.g. longitude, latitude) during a "drive test", such geographic information can be inadequate to specify the radio frequency environment uniquely. Depending on the accuracy of the location information, the same location can refer to an outdoor or indoor radio frequency environment that can have substantially different radio frequency propagation characteristics. Effective use of the location information can also, in some cases, require access to proprietary mapping information.

We propose classifying the radio frequency environment based on matching the collected statistical data by a radio frequency scanner during a field test to a set of pre-defined ranges associated with each radio frequency environment A pre-defined range can include a set of values above or below a pre-defined threshold, a set of values between a minimum value and a maximum value, or a set of values at an approximate value. A representative table of values for each of six different types of statistical data that can be collected by a radio frequency scanner in five different radio frequency environments is shown below.

|  | Urban | Rural | Suburban | Highway | Indoors |
| --- | --- | --- | --- | --- | --- |
| Delay spread | 500 ns | 100 ns | 250-300 ns | 200 ns | 10-50 ns |
| # of taps | 6-8 taps | 3-4 taps | 4-6 taps | 3-4 taps | 6-8 taps |
| # of PSCs | 10-15 SCs | 4-5 SCs | 6-8 SCs | 4-5 SCs | 6-8 SCs |
| RSCP/RSSI | −60 to −80 dBm | −90 to −110 dBm | −70 to −90 dBm | −60 to −80 dBm | −80 to −100 dBm |
| EcIo | −6 to −12 dB | 0 to −3 dB | −3 to −6 dB | 0 to −3 dB | −3 to −6 dB |
| Speed | 30 km/h | 80 to 100 km/h | 60 km/h | 80 to 100 km/h | 3 to 10 km/h |

The set of statistical data values over a time interval can be used to estimate in which type of radio frequency environment the data was collected. The statistical data values can be each used alone or in combination to choose an appropriate radio frequency environment, as each piece of statistical data can provide a different bit of information. For the specific types of statistical data listed in the table, the delay spread can provide a measure of the amount of multi-path in the wireless communication path between the transmitting base transceiver station and the receiving wireless mobile communication device. The delay spread can vary significantly as indicated in the table between different radio frequency environments. The number of taps can indicate the length of a receive equalizer and can also provide a measure of distortion introduced to signals by the wireless communication path. The number of primary synchronization codes (PSC) observed by the radio frequency scanner can indicate a number of different base transceiver stations potentially available to a mobile wireless communication device. In a dense "urban" environment, a substantially larger number of base transceiver stations can be available compared with a sparse "rural" environment for example. The received signal code power (RSCP) and received signal strength indication (RSSI) can provide a measure of the strength of signals as received by a mobile wireless communication device at a specific location relative to a particular transmitting base transceiver station. In a rural environment, the received signal power can be lower than in a denser urban or suburban environment. The Edo ratio can provide a measure of the strength of serving cell signal power relative to total receive noise power, while "Speed" can indicate the movement of the mobile wireless communication device. The radio frequency environment classification can be repeated over each successive time interval of the captured statistical data, providing a sequence of dynamically changing radio frequency environments. The mapping of the captured statistical data into subsets of statistical data can differ in each time interval based on the radio frequency environment selected by the classification for that time interval.

The mapping of statistical data during a time interval can select a subset of the total collected statistical data for that time interval. For example, data associated with four to six individual cells can be selected out of sixteen or more observable cells collected during a time interval of a drive test. In an "urban" radio frequency environment, a large number of cells can be measured to have a high level of signal strength with a delay spread of a few micro-seconds. An "urban" mapping of the statistical data can choose three cells with the highest signal power during a time interval and leave a fourth "open" observation slot that can extract data from cells that enter and exit rapidly during the time interval. In a "rural" radio frequency mapping, on the other hand, the top four cells based on signal strength alone can be chosen for play back. In a dense "urban" environment, a mapping can model pilot pollution by choosing cells that use the same frequency and scrambling codes but arrive with varying time delays. A "repeater" can be modeled by varying the time delay to be outside of the measurement window of a typical receiver.

Figure 2:
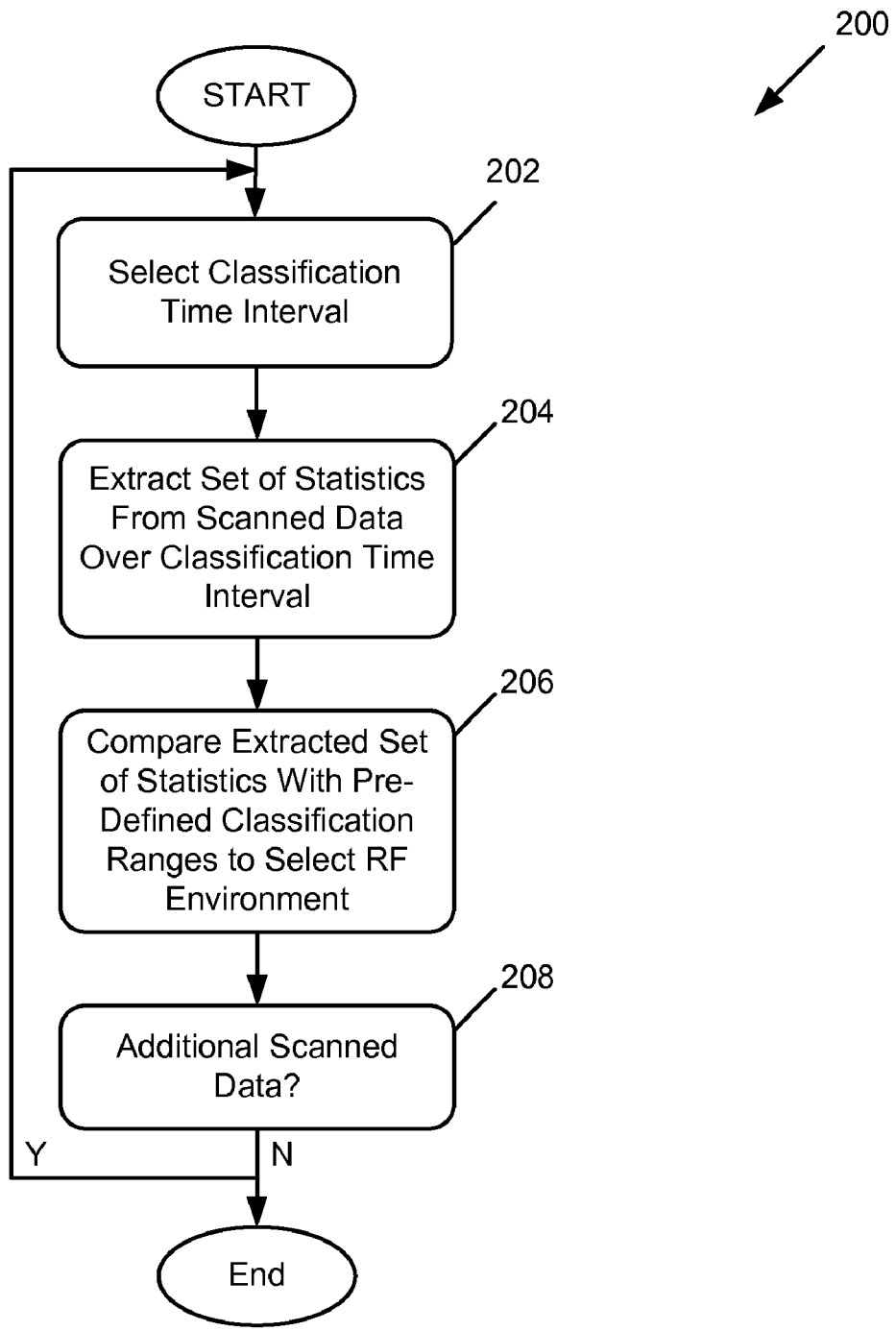
FIG. 2 illustrates a representative method for dynamic radio frequency environment classification.

FIG. 2 illustrates an exemplary method 200 for dynamically classifying a set of scanned statistical data collected by a radio frequency scanner for the mobile wireless communication device 106 in the wireless communication network 100. In step 202, a classification time interval can be selected. This classification time interval can vary from relatively short intervals of less than one minute to relatively long intervals of 30 minutes or more. The scanned statistical data collected by the radio frequency scanner can be parsed into segments of data based on the selected classification time interval. The length of the classification time interval can be identical for each segment or can vary for each segment throughout the set of scanned statistical data. In step 204, a set of statistics can be extracted from the complete set of scanned statistical data over the selected classification time interval. Extracted statistics can include key characteristics of the radio frequency statistical data that can be used to identify the radio frequency environment in which the scanned statistical data was collected. Exemplary statistics include the number of cells observed during the classification time interval, average signal strength per cell observed, a delay spread and a number of multi-paths present during the classification time interval. In step 206, the extracted set of statistics can be compared against pre-defined classification ranges for the statistics to select a radio frequency environment. The comparison can include calculating a probability for each radio frequency environment based on matching the extracted set of statistics with the pre-defined classification ranges and choosing a most likely radio frequency environment that matches. If additional scanned statistical data remains to be classified, as indicated in step 208, then the cycle of classifying, extracting, comparing and selecting can be repeated.

Figure 3:
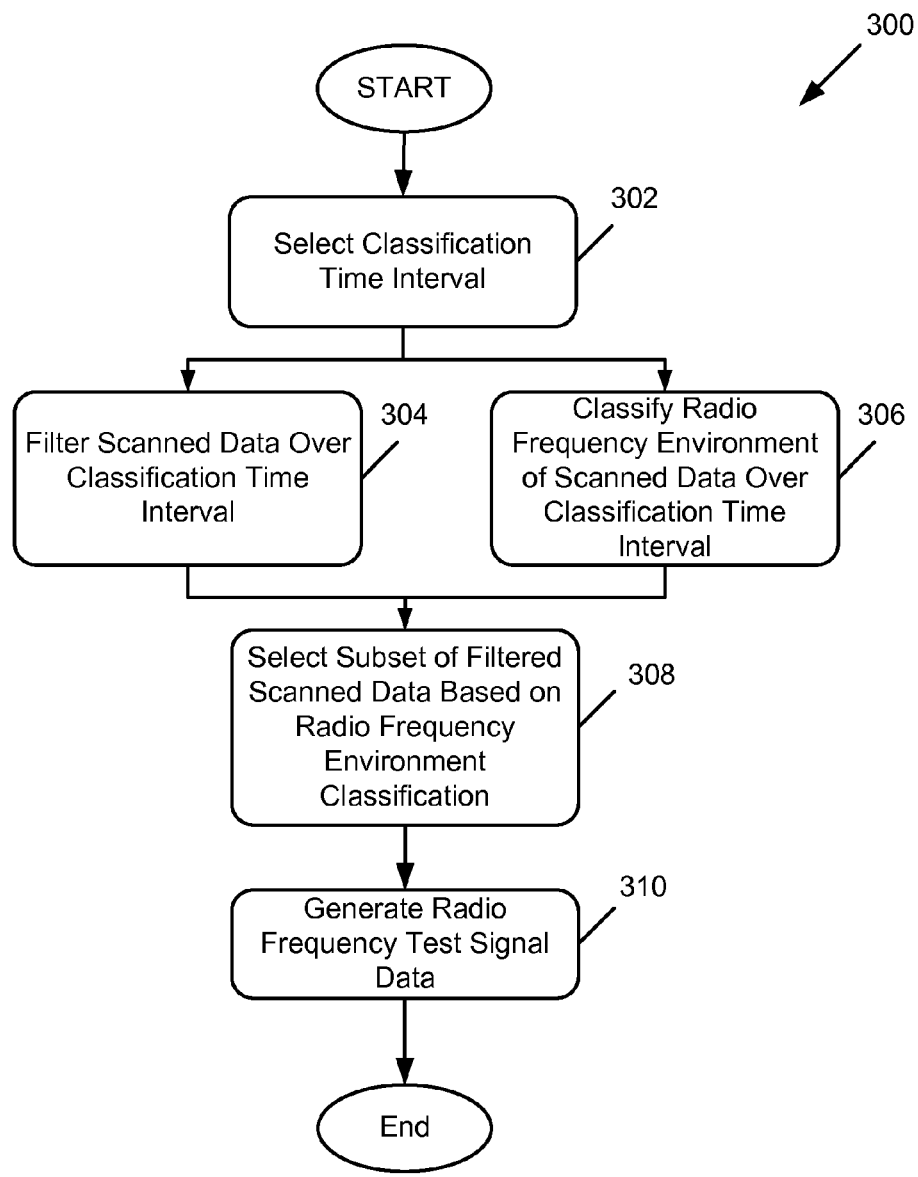
FIG. 3 illustrates a representative method for generating radio frequency test data for a mobile wireless communication device.

Play back in a laboratory setting of scanned statistical data captured during an actual field "drive test", which includes a dynamically changing radio frequency environment, can use the dynamic classification method described for FIG. 2 to improve generating radio frequency test data from the scanned statistical data. FIG. 3 illustrates a representative method 300 of generating radio frequency test data from scanned statistical data collected by a radio frequency scanner during a field test. In step 302 a classification time interval can be selected over which the scanned statistical data can be processed. The total scanned statistical data from a particular "drive test" can be divided in a sequence of distinct time intervals. Over each classification time interval, in step 304, the scanned statistical data can be filtered to fill in irregularities and remove glitches from the scanned statistical data. In step 306, the scanned statistical data can be classified for each classification time interval into one of several possible radio frequency environments. The classification can use statistics extracted from the scanned statistical data over the classification time interval. Successive time intervals can be classified into different radio frequency environments depending on the specific statistical data in the time interval. In step 308, a subset of the filtered scanned statistical data can be selected based on the radio frequency environment classification. Different radio frequency environment classifications can result in selecting different subsets of the filtered scanned statistical data. In step 310, radio frequency test signal data can be generated from the selected subset of filtered scanned statistical data. The generated radio frequency test signal data can be a reproduction of the radio frequency signals captured by the radio frequency scanner from the base transceiver stations in the wireless communication network or can be simulated versions of the radio frequency signals shifted in frequency and/or time to simulate different radio frequency carriers or different time delays.

Figure 4:
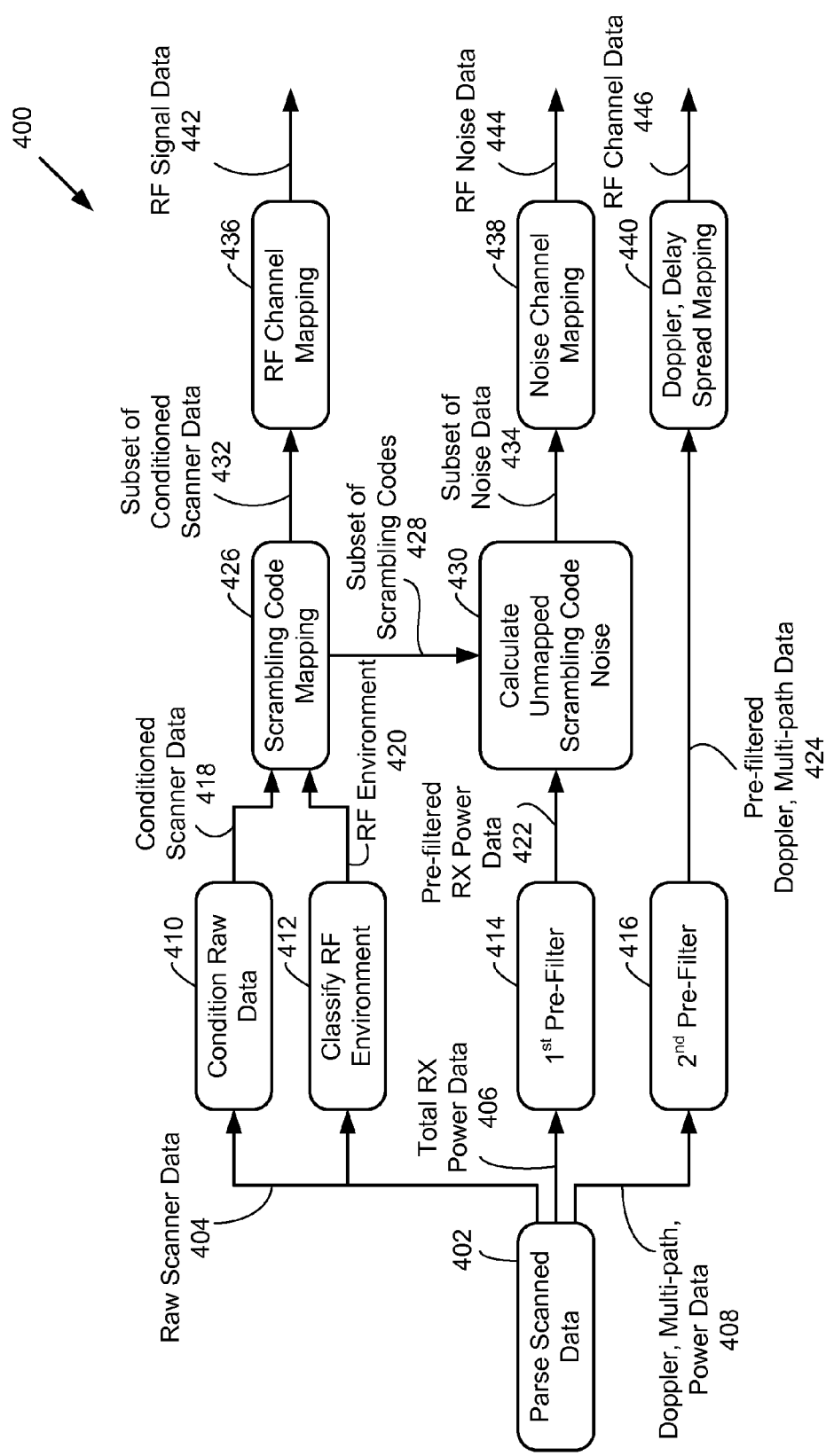
FIG. 4 illustrates another representative method for generating radio frequency test data for a mobile wireless communication device.

FIG. 4 illustrates another representative method 400 of generating radio frequency test data from scanned statistical data. A set of scanned statistical data can be parsed 402 into three separate groups for processing. A set of "raw" scanner data 404 can be input to a processing block 410 that "conditions" the "raw" scanner data, for example by filling gaps in measured values and filtering the data for spurious noise and glitches. In parallel the "raw" scanner data 404 can be input to a processing block 412 to classify the dynamically changing radio frequency environment in which the scanned data was collected. The output of the radio frequency classification block 412 can be a sequence of radio frequency environments 420 that can vary over successive classification time intervals. FIG. 2 illustrated a representative method for radio frequency environment classification.

Over a classification time interval, "conditioned" scanner data 418 and a radio frequency environment 420 selected by the classification processing block 412 can be used by a scrambling code mapping block 426 to select a subset of the conditioned scanner data 432 for further processing. A scrambling code can identify radio frequency channel signals transmitted by a base transceiver station in a cell of the wireless communication network. Each base transceiver station in different cells can use different scrambling codes. The subset of conditioned scanner data 432 can depend on the radio frequency environment 420 selected by the classification processing block 412. Scrambling code mapping thus selects some of the conditioned scanned statistical data based on the classified radio frequency environment for further processing. A radio frequency channel mapping block 436 can modify the subset of conditioned scanner data 432 to produce radio frequency signal data 442 for testing the mobile wireless communication device 106. Radio frequency channel mapping can be used to adapt scanned statistical data collected on one set of radio frequency channels (for example in a European wireless communication network) to a different set of frequency channels (for example in a North American wireless communication network). The radio frequency channel mapping in processing block 436 can also change the time position of selected cells relative to other cells, for example by adding or subtracting delays in the signals for the selected cell. The modified radio frequency signal data 442 can then be used to simulate receiving signals from a base transceiver station in a cell that is "newly" observable by a mobile wireless communication device. The flexibility of changing the characteristics of the radio frequency signal data 442 using the radio frequency channel mapping block 436 can provide a broad variety of wireless communication network configurations.

In parallel with generating radio frequency signal data 442, radio frequency noise data 444 and radio frequency channel data 446 can also be generated. Radio frequency noise data 444 can represent received signal power that is not identified as radio frequency signal data 442 in the selected subset of conditioned scanner data. Total receive power data 406 can be passed through a first pre-filter 414 to smooth the total receive power data 406. The pre-filter 414 frequency response can vary based on the speed of the radio frequency scanner at which the total receive power data 406 was collected. Using the subset of scrambling codes 428 selected by the scrambling code mapping block 426, a subset of the pre-filtered receive power data 422 associated with unmapped scrambling codes can be calculated as noise resulting in a subset of noise data 434. A noise channel mapping block 438 can then generate radio frequency noise data 444 for testing the mobile wireless communication device 106. A noise channel mapping can calculate a residual power received by a mobile wireless communication device after removing the power of cells that are mapped for playback. The noise channel mapping can provide a measure of overall interference in a system when playing back data at a particular frequency.

In some embodiments, the radio frequency signal data 442 and the radio frequency noise data 444 can be passed through a radio frequency channel emulator. Outputs of the radio frequency channel emulator can be used to test the performance of specific hardware and firmware configurations of a mobile wireless communication device. Rather than use an average statistical wireless network communication model for simulation, the radio frequency channel emulator can provide a more realistic and specific set of radio frequency signal and noise data based on actual scanned radio frequency signals. The radio frequency channel emulator can accept radio frequency channel data 446 generated from modified portions of the scanned statistical data in addition to the radio frequency signal data 442 and the radio frequency noise data 444. In particular, Doppler and multi-path power data 408 can be passed through a second pre-filter 416 and then modified by a Doppler and delay spread mapping block 440 that provides time-varying radio frequency channel data to simulate key network propagation characteristics observed during the drive test. Using the combination of radio frequency signal data 442, radio frequency noise data 444 and radio frequency channel data 446, a more accurate reproduction of actual operating conditions for the mobile wireless communication device 106 can be achieved.

Figure 5:
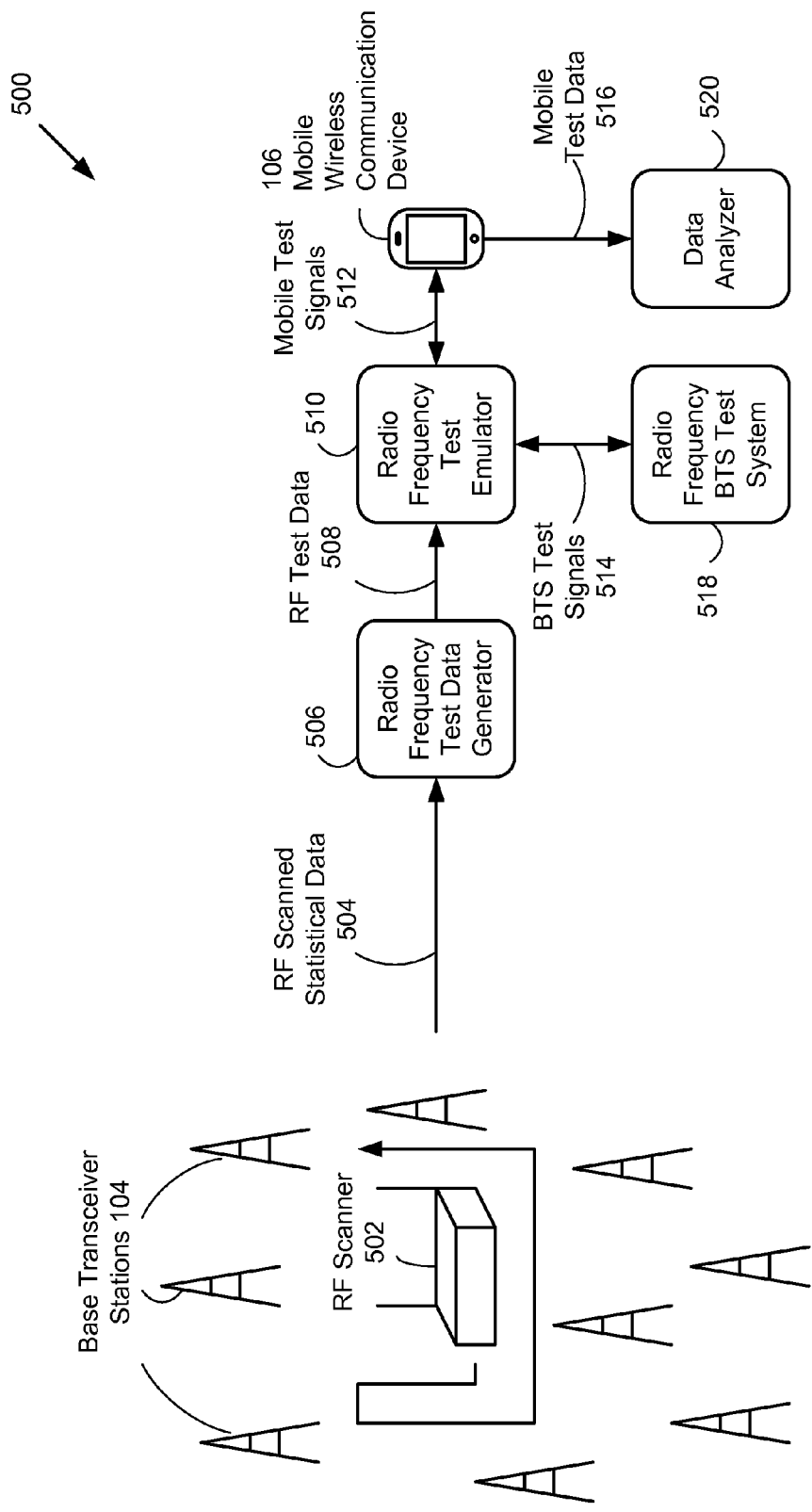
FIG. 5 illustrates a representative apparatus for testing mobile wireless communication device.

FIG. 5 illustrates a representative apparatus for testing the mobile wireless communication device 106. A radio frequency scanner 502 can collect a set of scanned statistical data derived from radio frequency signals received from base transceiver stations 104 during a drive test throughout one or more cells of the wireless communication network 100. The collected radio frequency scanned statistical data 504 can be processed by a radio frequency test data generator 506 that outputs a set of radio frequency test data 508. The radio frequency test data 508 can include radio frequency signal data 442, radio frequency noise data 444 and radio frequency channel data 446 as generated in FIG. 4.

The radio frequency test data 508 can be processed by a radio frequency test emulator 510 that interfaces with the mobile wireless communication device 106 to emulate in a laboratory environment the drive test in which the scanned data was collected. The radio frequency test emulator can also emulate modified versions of the drive test, such as changes to specific configurations of the wireless communication network 100. Different wireless communication network configurations can be tested by changing the parameters used when generating the radio frequency test data 508 by the radio frequency test data generator 506, such as by selecting different sets of data in different time intervals based on estimated radio frequency environments.

The radio frequency test emulator 510 can also receive a set of BTS test signals 514 from a radio frequency BTS test system 518 that can emulate one or more base transceiver stations in a wireless communication network. The radio frequency BTS test system 518 can be a BTS emulator or actual equipment for base transceiver stations as used in a network and configured for a laboratory environment (e.g. low power, short distance transmissions). The radio frequency test emulator 510 can modify the BTS test signals 514 received from the radio frequency BTS test system 518 based on the RF test data 508 thereby emulating the actual drive test conditions (or variants thereof). For example, the BTS test signals 514 can be adjusted to different signal power levels, shifted to different carrier frequencies, shifted by time delays, combined with different noise power levels, changed by communication channel parameters that include Doppler shift, multi-path and other network variables based on the RF test data 508.

The mobile wireless communication device 106 can receive mobile test signals 512 through a downlink channel from the radio frequency test emulator 510 and also transmit mobile test signals 512 on an uplink channel to the radio frequency test emulator 510, which can then transmit back to the radio frequency BTS test system 518. The radio frequency BTS test system can monitor and evaluate protocol message handling by the mobile wireless communication device 106 with the radio frequency test emulator 510 emulating a wireless communication channel based on data derived from an actual drive test. A data analyzer 520, such as a personal computer with software, can be connected to the mobile wireless communication device 106 to receive and analyze mobile test data collected by the mobile wireless communication device 106 during a test.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of generating a radio frequency test signal for a mobile wireless communication device from a set of scanned radio frequency data, the method comprising:

classifying a segment of the set of scanned radio frequency data into one of a plurality of radio frequency environments, wherein the set of scanned radio frequency data represents a plurality of radio frequency channels over a time interval;

selecting a subset of the segment of scanned radio frequency data based on the classified radio frequency environment; and generating a segment of the radio frequency test signal using the selected subset of scanned radio frequency data.

2. The method as recited in claim 1 wherein the subset of the segment of scanned radio frequency data includes radio frequency data for a subset of the radio frequency channels selected from the plurality of radio frequency channels over the time interval.

3. The method as recited in claim 2 wherein generating the segment of radio frequency test signal includes shifting a radio frequency channel carrier frequency of a portion of the selected subset of scanned radio frequency data associated with at least one of the subset of selected radio frequency channels over the time interval.

4. The method as recited in claim 2 wherein generating the segment of radio frequency test signal includes shifting in time a portion of the selected subset of scanned radio frequency data associated with at least one of the subset of selected radio frequency channels over the time interval.

5. The method as recited in claim 1 further comprising:
dividing the set of scanned radio frequency data into a successive series of segments, each segment including scanned radio frequency data over a time interval; and
repeating the classifying, selecting and generating steps for each of the successive segments of scanned radio frequency data.

6. The method as recited in claim 5 further comprising:
processing each successive segment of scanned radio frequency data to fill gaps in measured data and to filter spurious noise.

7. The method as recited in claim 6 wherein the classifying comprises:
extracting a set of statistics from the segment of scanned radio frequency data over the time interval;
comparing the extracted set of statistics with pre-defined classification ranges to determine a likelihood of each one of the plurality of radio frequency environments; and
classifying the segment of scanned radio frequency data based on the determined likelihoods.

8. The method as recited in claim 7 wherein the plurality of radio frequency environments comprises at least one of an urban environment, a suburban environment, a rural environment, a highway environment and an indoor environment.

9. The method as recited in claim 7 further comprising:
generating a set of radio frequency noise data by
extracting a set of total receive power data from the segment of scanned radio frequency data;
determining a subset of scrambling codes associated with the selected subset of the segment of scanned radio frequency data; and
calculating a set of radio frequency noise data from the extracted set of total receive power data based on the determined subset of scrambling codes.

10. An apparatus for generating a radio frequency test signal for testing a mobile wireless communication device, the apparatus comprising:
a radio frequency test data generator configured to generate the radio frequency test signal by
dividing a set of scanned radio frequency data into a sequence of segments;
classifying each segment of scanned radio frequency data into one of a plurality of radio frequency environments;
selecting a subset of each segment of scanned radio frequency data based on the classified radio frequency environment for the segment; and
generating a segment of the radio frequency test signal from each selected subset of scanned radio frequency data;
wherein each segment of scanned radio frequency data represents a plurality of radio frequency channels collected over a distinct time interval.

11. The apparatus as recited in claim 10, wherein the radio frequency test data generator generates at least one segment of the radio frequency test signal by shifting a carrier frequency of at least one of the radio frequency channels associated with a base transceiver station in the selected subset of scanned radio frequency data.

12. The apparatus as recited in claim 10, wherein the radio frequency test data generator classifies each segment of scanned radio frequency data by:
extracting a set of statistics from the segment of scanned radio frequency data over the time interval;
comparing the extracted set of statistics with pre-defined classification ranges to determine a likelihood of each one of the plurality of radio frequency environments; and
classifying the segment of scanned radio frequency data based on the determined likelihoods.

13. The apparatus as recited in claim 12 wherein the plurality of radio frequency environments comprises at least one of an urban environment, a suburban environment, a rural environment, a highway environment and an indoor environment.

14. The apparatus as recited in claim 12, wherein the radio frequency test generator further generates a segment of radio frequency noise data by:
determining a subset of radio frequency channels associated with the selected subset of the segment of scanned radio frequency data;
calculating receive noise power data for the subset of radio frequency channels over the time interval of the segment of scanned radio frequency data; and
removing the calculated receive noise power data from a total receive power data of the scanned radio frequency data over the time interval to generate the segment of radio frequency noise data.

15. The apparatus as recited in claim 14, wherein the radio frequency test generator further generates a segment of radio frequency channel data based on Doppler shift and multi-path data for the plurality of radio frequency channels in the segment of scanned radio frequency data over the time interval.

16. The apparatus as recited in claim 15, further comprising:
a radio frequency test emulator configured to generate a set of mobile test signals to test the mobile wireless communication device over the time interval using the generated segment of radio frequency test signal, the generated segment of radio frequency noise data, and the generated segment of radio frequency channel data.

17. The apparatus as recited in claim 16, further comprising:
a radio frequency base transceiver station test system configured to generate a set of base transceiver station test signals, wherein the radio frequency test emulator modifies the set of base transceiver station test signals to generate the set of mobile test signals based on the generated segment of radio frequency test signal, the generated segment of radio frequency noise data, and the generated segment of radio frequency channel data.

18. A non-transitory computer readable medium for tangibly storing computer program code executable by a processor for generating a radio frequency test signal for a mobile wireless communication device from a set of scanned radio frequency data comprising:
- computer program code for classifying a segment of scanned radio frequency data collected from a plurality of base transceiver stations over a time interval into one of a plurality of radio frequency environments;
- computer program code for filtering the segment of scanned radio frequency data;
- computer program code for selecting a subset of the filtered segment of scanned radio frequency data based on the classified radio frequency environment; and
- computer program code for generating a segment of the radio frequency test signal from the selected subset of scanned radio frequency data.

19. The non-transitory computer readable medium as recited in claim 18, wherein computer program code for generating the segment of radio frequency test signal includes computer program code for shifting a carrier frequency of a portion of the selected subset of scanned radio frequency data associated with one of the plurality of base transceiver stations.

20. The non-transitory computer readable medium as recited in claim 18, wherein computer program code for generating the segment of radio frequency test signal includes computer program code for shifting in time a portion of the selected subset of scanned radio frequency data associated with one of the plurality of base transceiver stations.

21. The non-transitory computer readable medium as recited in claim 18 further comprising:
- computer program code for repeating the classifying, filtering, selecting and generating steps for a successive series of non-overlapping segments of the scanned radio frequency data.

22. The non-transitory computer readable medium as recited in claim 21, wherein the computer program code for classifying the segment of scanned radio frequency data comprises:
- computer program code for calculating a set of statistics from the segment of scanned radio frequency data over the time interval;
- computer program code for comparing the calculated set of statistics with pre-defined classification ranges to select a radio frequency environment classification for the segment of scanned radio frequency data.

23. The non-transitory computer readable medium as recited in claim 22 wherein the radio frequency environment classification is selected from the group consisting of an urban environment, a suburban environment, a rural environment, a highway environment and an indoor environment.

* * * * *